(12) United States Patent
Shi

(10) Patent No.: US 10,878,374 B1
(45) Date of Patent: Dec. 29, 2020

(54) TECHNIQUES FOR UTILIZING MULTI-FUNCTIONAL STORAGE CONTAINERS

(71) Applicant: Amazon Technologies, Inc., Seattle, WA (US)

(72) Inventor: Jane Shi, Tewksbury, MA (US)

(73) Assignee: Amazon Technologies, Inc., Seattle, WA (US)

( * ) Notice: Subject to any disclaimer, the term of this patent is extended or adjusted under 35 U.S.C. 154(b) by 161 days.

(21) Appl. No.: 16/179,346

(22) Filed: Nov. 2, 2018

(51) Int. Cl.
| | |
|---|---|
| *G06F 7/00* | (2006.01) |
| *G06Q 10/08* | (2012.01) |
| *G06Q 30/06* | (2012.01) |
| *G06Q 50/28* | (2012.01) |
| *B65G 1/137* | (2006.01) |
| *B25J 9/16* | (2006.01) |
| *G06K 9/00* | (2006.01) |

(52) U.S. Cl.
CPC ............ *G06Q 10/087* (2013.01); *B25J 9/162* (2013.01); *B25J 9/1664* (2013.01); *B65G 1/1373* (2013.01); *G06K 9/00671* (2013.01); *G06Q 30/06* (2013.01); *G06Q 50/28* (2013.01); *G05D 2201/0216* (2013.01)

(58) Field of Classification Search
None
See application file for complete search history.

(56) References Cited

U.S. PATENT DOCUMENTS

| | | | |
|---|---|---|---|
| 8,280,547 B2 | 10/2012 | D'Andrea et al. | |
| 8,965,560 B2* | 2/2015 | Mathi | B65G 1/1378 700/216 |
| 9,087,314 B2 | 7/2015 | Hoffman et al. | |
| 10,209,711 B1* | 2/2019 | Brazeau | G06N 20/00 |
| 2017/0036798 A1* | 2/2017 | Prahlad | G06Q 50/28 |
| 2017/0364074 A1* | 12/2017 | Lau | G06Q 10/08355 |
| 2018/0276739 A1* | 9/2018 | Chopp | G06Q 30/0631 |
| 2018/0284760 A1* | 10/2018 | Gupta | B25J 13/006 |

* cited by examiner

*Primary Examiner* — Yolanda R Cumbess
(74) *Attorney, Agent, or Firm* — Kilpatrick Townsend & Stockton LLP

(57) ABSTRACT

Systems and methods are provided herein for utilizing multi-functional storage containers to store items within a facility. An indication may be received that an item is to be stored within some storage container within the facility. The storage container may be a multi-functional storage container configured with a first set of storage compartments designated for items that are to be manually placed and a second set of storage compartments designated for items that are to be robotically placed. A placement method (e.g., robotic or manual) may be determined for the item and a storage component of the storage container selected based at least in part on the determined placement method. Once the storage component is selected, instructions may be provided to a robotic device (for robotic placement) or a computing device (for manual placement) instructing that the item be placed at the selected storage component.

20 Claims, 9 Drawing Sheets

TECHNIQUES FOR UTILIZING MULTI-FUNCTIONAL STORAGE CONTAINERS

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become nontrivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Coordination between various components of an inventory system is desirable to improve efficiency and throughput within the inventory system.

BRIEF DESCRIPTION OF THE DRAWINGS

Various embodiments in accordance with the present disclosure will be described with reference to the drawings, in which.

DETAILED DESCRIPTION

Figure 1:
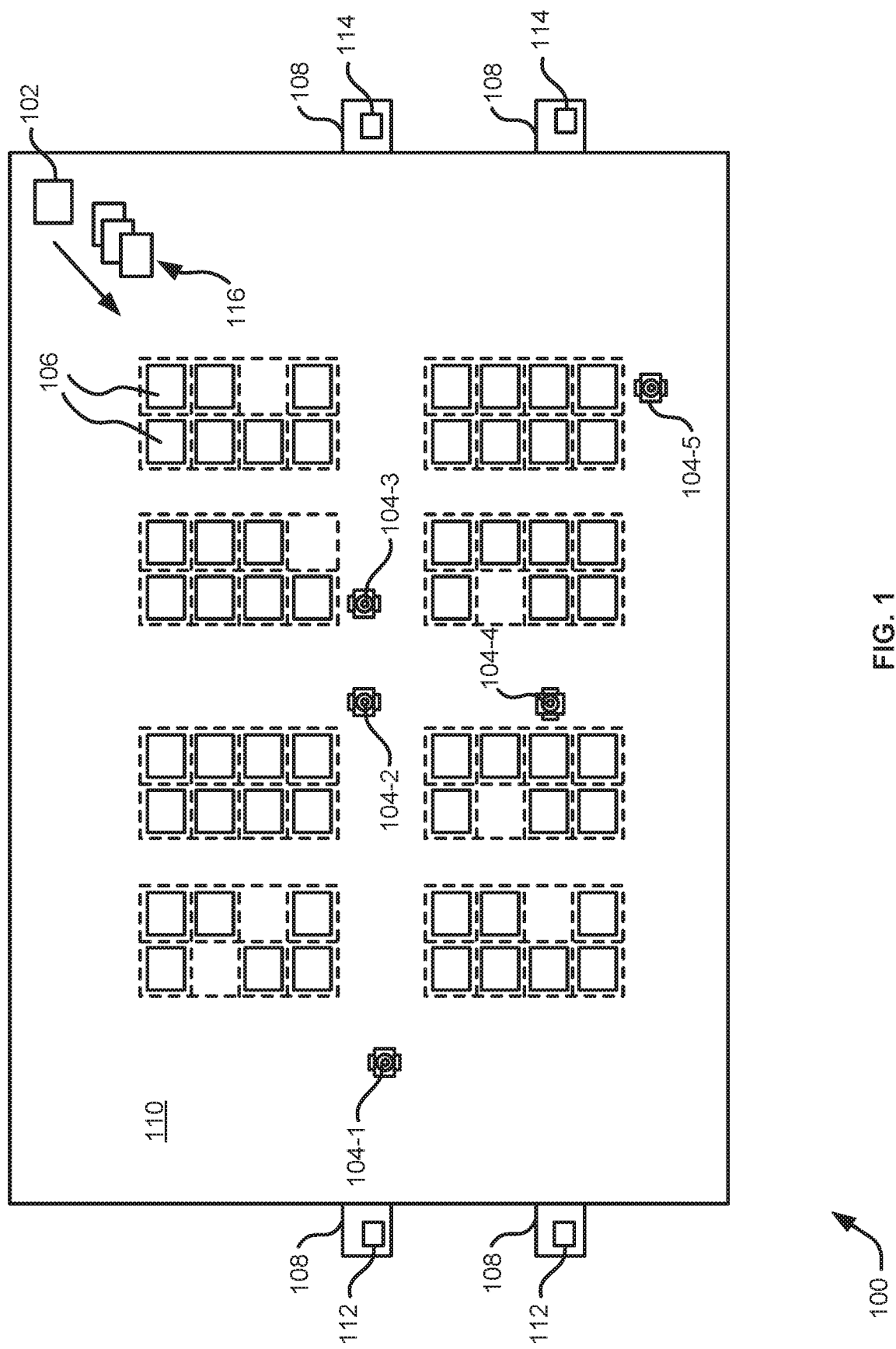
FIG. 1 is a schematic diagram illustrating an example environment suitable for implementing aspects of an inventory system, in accordance with at least one embodiment.

Techniques described herein are directed to systems and method for utilizing multi-functional storage containers for item placement and/or retrieval within an inventory system. In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In at least one embodiment, a management module of an inventory system may be responsible for determining tasks and assigning individual tasks to individual components of the system (e.g., mobile drive units (MDUs), robotic arms, personnel, etc.). For example, the inventory system may be a storage facility operated by, or on behalf of an electronic marketplace provider (e.g., an online retailer of physical items). In this example, the management module may determine that an item (e.g., a single item, multiple items, a pallet, a cart, or any suitable container that stores one or more items) is to be stored within the storage facility.

Within the storage facility a number of multi-functional storage containers may be utilized. These multi-functional storage containers may include at least one area configured to be optimal for robotic manipulation and at least one area configured to be optimal for manual manipulation (e.g., non-mechanical manipulation). By way of example, some multi-functional storage containers (herein referred to as a "storage container") may include two areas configured for robotic storage (or retrieval). These areas may be situated near the floor to a threshold lower height and above a threshold upper height to the top of the storage container. These storage containers may also include an area configured for manual storage (or retrieval) by personnel. The area configured for manual storage may be situated between the threshold lower height and the threshold upper height so as to provide an area that is optimal for manual storage. That is, within this area, personnel may be able to reach each storage location (e.g., a bin, a shelf, a tray, an alcove, etc.) without bending over and/or within the use of a ladder or step stool. Accordingly, robotic devices may be utilized to store and/or retrieve items from areas of the storage container that might cause discomfort or be inconvenient for personnel to utilize. By designating relatively high and/or low storage locations as appropriate storage locations for robotic manipulation, the efficiency of the storage facility may be improved as retrieval of height adjusting apparatuses (e.g., ladders, stools, etc.) would be unnecessary.

According to some embodiments, the management module may be configured to determine an appropriate storage location for an item. This determination may be based at least in part on any suitable attribute associated with the item (e.g., weight, item category, item material, package dimensions, etc.) as well as available space within storage containers of the storage facility. The management module may identify, for example, that a very heavy item is to be stored by a robotic device (e.g., a robotic arm) while a fragile item is to be manually stored (e.g., stored by personnel). In some embodiments, the item could be determined to be robotically or manually storable and either a robotic device or personnel may be selected for the task. If the item is to be stored by a robotic device, the management module may be configured to determine an available storage location from the areas of the storage containers that are designated for robotic manipulation. Similarly, if the item is to be stored by personnel, the management module may be configured to determine an available storage location from the areas of the storage containers that are designated for manual manipulation. The management module may maintain an association for each storage container (e.g., shelf, bin, tray, alcove, etc.) that indicates whether the storage location is designated for robotic manipulation and/or for manual manipulation. These associations may be utilized when determining a suitable storage location for an item by enabling the management module to determine a storage location having a designation that corresponds with the method (e.g., robotic manipulation or manual manipulation) to be used for storing the item.

For retrieval of items that have been previously stored, the management module may determine whether the item has been stored in an area designated for robotic manipulation and/or for manual manipulation. If the item has been stored in an area designated for robotic manipulation, the management module may assign a robotic device to retrieve the item. Similarly, if the item has been stored in an area designated for manual manipulation, the management module may assign personnel to retrieve the item.

In at least one embodiment, the management module may be configured to enforce one or more policies in order to ensure that items that are to be robotically stored/retrieved are not stored in areas designated for manual manipulation. Enforcement of such policies may also enable the management module to ensure that items that are to be manually stored/retrieved are not stored in areas designated for robotic manipulation.

It should be appreciated that the techniques discussed above are applicable in contexts other that inventory situations. Utilizing the techniques discussed herein, the inventory system may operate more efficiently by reducing the necessity for personnel to bend or reach to areas that are more easily reached by a robotic device. Additionally, these personnel would require no additional equipment such as ladders or step stools in order to perform their task, which may reduce delay in task performance by eliminating the need to retrieve such equipment.

FIG. 1 is a schematic diagram illustrating an example environment suitable for implementing aspects of an inventory system 100, in accordance with at least one embodiment. As a non-limiting example, the inventory system 100 may include a management module 102, one or more mobile drive units (e.g., mobile drive unit 104-1, mobile drive unit 104-2, mobile drive unit 104-3, mobile drive unit 104-4, and mobile drive unit 104-5, hereinafter referred to as "mobile drive units 104"), one or more storage containers 106, and one or more stations 108. In some embodiments, stations 108 may include one or more robotic devices 112 (e.g., robotic arms, robotic devices configured to store and/or retrieve items from the storage containers 106, etc.). In some embodiments, the stations 108 may include one or more personnel 114. The mobile drive units 104 may transport storage containers 106 between points within a workspace 110 (e.g., a warehouse, a storage facility, or the like) in response to commands communicated by management module 102. While the management module 102 is depicted in FIG. 1 as being separate from the mobile drive units 104, it should be appreciated that the management module 102, or at least some aspects of the management module 102, may be additionally or alternatively be performed by a processor of the mobile drive units 104. Within the inventory system 100, each of the storage containers 106 may store one or more types of inventory items. As a result, inventory system 100 may be capable of moving inventory items between locations within the workspace 110 to facilitate the entry, processing, and/or removal of inventory items from inventory system 100 and the completion of other tasks involving inventory items.

At least some of the storage containers 106 may be configured to include at least two areas. One area may be configured for manual placement (e.g., placement by personnel 114) while another area may be configured for robotic placement (e.g., placement by robotic devices 112). In some embodiments, the storage containers may include more than one area configured for manual placement and/or more than one area configured for robotic placement. The management module 102 may maintain a mapping (or another suitable association method) between placement designations (e.g., manual placement and/or robotic placement) for the areas. An area may include one or more storage components (e.g., bins, totes, trays, drawers, shelves, alcoves, or any suitable combination of the above). In some embodiments, the management module 102 may maintain an association between a placement designation and each storage component of the storage containers 106.

It should be appreciated that a storage component of the storage containers 106 may be configured with one or more physical markers (QR codes, RFID tags, etc.) that identify a subsection of the storage component. In some embodiments, the management module 102 may maintain a location of stored items based at least in part on an identifier of the storage component and/or an identifier of the subsection of the storage component. Accordingly, tasks for placement of an item may include the identifier of the storage component and the identifier of the subsection of the storage component. Instructions provided to the robotic devices 112 and/or the computing device associated with the personnel 114 may include both identifiers. The robotic devices 112 may be configured to read (e.g., via a scanner, or via any suitable sensor accessible to the robotic device) the physical markers of the storage component to identify proper placement of the item within the storage component. Similarly, the computing device of the personnel 114 may be utilized to read the physical markers of the storage component to identify proper placement of the item.

According to some embodiments, the management module 102 may be configured to receive an indication that an item is to be stored within the workspace 110. The management module 102 may determine a storage component (and/or a subsection of a storage component) to store the item. In some embodiments, this determination may be based on at least in part on one or more attributes of the item (e.g., weight, package dimensions, item material, item category (e.g., clothing, fragile, perishable, electronics, etc.), and/or any suitable attribute associated with the item. The management module 102 may further determine a storage component to store the item based at least in part on availability of the robotic devices 112 to store the item, availability of the personnel 114 to store the item, availability of a storage component capable of storing the item, one or more attributes associated with the storage component (e.g., dimensions, available space, etc.), one or more attributes associated with a subsection of the storage component (e.g., associated with a physical marker) or any suitable combination of the above. Once a storage component (and/or a subsection of the storage component) is selected, the management module 102 may identify the designation (e.g., robotic placement and/or manual placement) associated with the storage component/subsection and may select an appropriate performer of the task from the components of inventory system 100. For example, if the designation associated with the determined storage component and/or subsection indicates the space is designated for robotic placement, the management module 102 may identify an available robotic device from the robotic devices 112 to perform the task. Similarly, if the designation associated with the determined storage component and/or subsection indicates that the space is designated for manual placement, the management module 102 may identify an available person from personnel 114 to perform the task. Instructions may be sent from the management module 102 to the selected robotic device or to a computing device associated with the selected personnel accordingly.

In some embodiments, the management module 102 may be configured to enforce one or more polices to ensure that items that are to be robotically placed are not assigned to a storage component/subsection that is designated for manually placed items. Similarly, the management module 102 may be configured to enforce one or more polices to ensure that items that are to be manually placed are not assigned to a storage component and/or subsection that is designated for robotically placed items.

In accordance with these techniques, the management module 102 may assign tasks to appropriate components of inventory system 100 and coordinates operation of the various components in completing the tasks. The management module 102 may select components of inventory system 100 (e.g., robotic devices 112, mobile drive units 104, and/or personnel 114, etc.) to perform these tasks and communicate appropriate commands and/or data to the selected components to facilitate completion of these operations. In some embodiments, the personnel 114 may utilize a computing devices such as a scanner, a smart device, or the like to receive such commands or exchange any suitable information with the management module 102. Although shown in FIG. 1 as a single, discrete component, the management module 102 may represent multiple components and may represent or include portions of the mobile drive units 104 or other elements of the inventory system 100. The components and operation of an example embodiment of management module 102 are discussed further below with respect to FIG. 6.

The mobile drive units 104 may move storage containers 106 between locations within the workspace 110. The mobile drive units 104 may represent any devices or components appropriate to move (e.g., propel, pull, etc.) a storage container based on the characteristics and configuration of the storage containers 106 and/or other elements of inventory system 100. In a particular embodiment of inventory system 100, the mobile drive units 104 represent independent, self-powered devices configured to freely move about the workspace 110. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, the mobile drive units 104 represent elements of a tracked inventory system configured to move the storage containers 106 along tracks, rails, cables, crane system, or other guidance or support elements traversing the workspace 110. In such an embodiment, the mobile drive units 104 may receive power and/or support through a connection to the guidance elements, such as a powered rail. Additionally, in particular embodiments of the inventory system 100 the mobile drive units 104 may be configured to utilize alternative conveyance equipment to move within the workspace 110 and/or between separate portions of the workspace 110.

Additionally, the mobile drive units 104 may be capable of communicating with the management module 102 to receive information identifying selection of the storage containers 106, transmit the locations of the mobile drive units 104, or exchange any other suitable information to be used by the management module 102 or the mobile drive units 104 during operation. The mobile drive units 104 may communicate with the management module 102 wirelessly, using wired connections between the mobile drive units 104 and the management module 102, and/or in any other appropriate manner. As one example, particular embodiments of the mobile drive unit 20 may communicate with the management module 102 and/or with one another using 802.11, Bluetooth, or Infrared Data Association (IrDA) standards, or any other appropriate wireless communication protocol. As another example, in a tracked inventory system 100, tracks or other guidance elements upon which the mobile drive units 104 move may be wired to facilitate communication between the mobile drive units 104 and other components of the inventory system 100. In general, the mobile drive units 104 may be powered, propelled, and controlled in any manner appropriate based on the configuration and characteristics of the inventory system 100.

In at least one embodiment, the storage containers 106 store inventory items. The storage containers 106 are capable of being carried, rolled, and/or otherwise moved by the mobile drive units 104. In some embodiments, the storage containers 106 may include a plurality of faces, and each storage component (e.g., a bin, a tray, a shelf, an alcove, etc.) may be accessible through one or more faces of the storage container 106. The mobile drive units 104 may be configured to rotate the storage containers 106 at appropriate times to present a particular face to an operator (e.g., a person) or other components (e.g., robotic devices 112) of the inventory system 100. Examples of these storage containers 106 are discussed in further detail below with respect to FIGS. 2-4.

In at least one embodiment, inventory items represent any objects suitable for storage, retrieval, and/or processing in an automated inventory system 100. For the purposes of this description, "inventory items" (also referred to as "items" or "an item") may represent any one or more objects of a particular type that are stored in the inventory system 100. In at least one example, the inventory system 100 may represent a mail order warehouse facility (e.g., operated by an electronic marketplace provider), and the items within the warehouse facility may represent merchandise stored in the warehouse facility. As a non-limiting example, the mobile drive units 104 may retrieve the storage containers 106 containing one or more inventory items requested in an order to be packed for delivery to a customer. Moreover, in some embodiments of the inventory system 100, boxes containing completed orders may themselves represent inventory items.

In particular embodiments, the inventory system 100 may also include one or more stations 108. The stations 108 represent locations designated for the completion of particular tasks involving inventory items. Such tasks may include the removal of inventory items from the storage containers 106, the introduction of inventory items into the storage containers 106, the counting of inventory items in the storage containers 106, the decomposition of inventory items (e.g. from pallet- or case-sized groups to individual inventory items), the consolidation of inventory items between the storage containers 106, and/or the processing or handling of inventory items in any other suitable manner. In particular embodiments, the stations 108 may represent the physical locations where a particular task involving inventory items can be completed within the workspace 110. In alternative embodiments, the stations 108 may represent both the physical location and also any appropriate equipment for processing or handling inventory items, such as robotic devices 112, scanners for monitoring the flow of inventory items in and out of the inventory system 100, communication interfaces for communicating with the management module 102, and/or any other suitable components. The stations 108 may be controlled, entirely or in part, by operators (e.g., personnel 114) or may be fully automated. Moreover, the personnel 114 and/or robotic devices 112 of the stations 108 may be capable of performing certain tasks involving inventory items, such as packing, counting, or transferring inventory items, as part of the operation of the inventory system 100.

In some embodiments, the robotic devices 112 may include any suitable device configured to receive tasks, instructions, or the like from the management module 102 and to execute operations to perform the task. In some embodiments, the management module 102 may include device instructions with the task assignment to the robotic devices 112 that causes the robotic devices 112 to execute those device instructions. In some embodiments, the management module 102 may provide a task and the robotic devices 112 may be configured with a logic module for determining devices instructions to be executed to perform the task. The robotic devices may include robotic arms, conveyor belts, or any suitable device capable of placing or retrieving an item to and/or from a storage component of the storage containers 106. By way of example, the robotic devices 112 may include robotic arms configured with an end effector such as a suction mechanism, a grasping mechanism, or the like. These robotic devices 112 may be configured to grasp or otherwise manipulate a storage component (e.g., a bin, a tote, a tray, a drawer, etc.) prior to item placement. By way of example, the robotic devices 112 may move and/or remove the storage component of the storage containers 106 such that the storage component is accessible for item placement. The robotic devices 112 may then grasp or otherwise move the item to the accessible storage component and place the storage component (not containing the item) back to the storage container 106. The robotic devices 112 may similarly be configured to remove items from the storage components by manipulating the storage component (e.g., moving the storage component such as pulling a drawer open, or removing the storage component such as removing a tray) to make the item accessible, removing the item from the storage component, and placing the storage component back to its original position within the storage container.

In at least one embodiment, the workspace 110 represents an area associated with the inventory system 100 in which the mobile drive units 104 can move and/or the storage containers 106 can be stored. For example, the workspace 110 may represent all or part of the floor of a mail-order warehouse in which the inventory system 100 operates. Although FIG. 1 shows, for the purposes of illustration, an embodiment of the inventory system 100 in which the workspace 110 includes a fixed, predetermined, and finite physical space, particular embodiments of the inventory system 100 may include the mobile drive units 104 and the storage containers 106 that are configured to operate within the workspace 110 that is of variable dimensions and/or an arbitrary geometry. While FIG. 1 illustrates a particular embodiment of the inventory system 100 in which the workspace 110 is entirely enclosed in a building, alternative embodiments may utilize the workspace 110 in which some or all of the workspace 110 is located outdoors, within a vehicle (such as a cargo ship), or otherwise unconstrained by any fixed structure.

In operation, the management module 102 may select appropriate components to complete particular tasks and may transmit task assignments 116 to the selected components to trigger completion of the relevant tasks. Each of the task assignments 116 defines one or more tasks to be completed by a particular component. These tasks may relate to the retrieval, storage, replenishment, and counting of inventory items and/or the management of the mobile drive units 104, the storage containers 106, the robotic devices 112, the personnel 114, the stations 108 and other components of the inventory system 100. Depending on the component and the task to be completed, a task assignment may identify locations, components, and/or actions/commands associated with the corresponding task and/or any other appropriate information to be used by the relevant component in completing the assigned task.

In particular embodiments, the management module 102 may generate task assignments 116 based, in part, on inventory requests that the management module 102 receives from other components of the inventory system 100 and/or from external components in communication with the management module 102. These inventory requests identify particular operations to be completed involving inventory items stored or to be stored within the inventory system 100 and may represent communication of any suitable form. For example, in particular embodiments, an inventory request may represent a shipping order specifying particular inventory items that have been purchased by a customer and that are to be retrieved from the inventory system 100 for shipment to the customer. After generating one or more of the task assignments 116, the management module 102 may transmit the generated task assignments 116 to appropriate components (e.g., mobile drive units 104, robotic devices 112, computing devices associated with personnel 114, etc.) for completion of the corresponding task. The relevant components may then execute their assigned tasks.

With respect to the mobile drive units 104 specifically, the management module 102 may, in particular embodiments, communicate task assignments 116 to selected mobile drive units 104 that identify one or more destinations for the selected mobile drive units 104. The management module 102 may select a mobile drive unit (e.g., mobile drive unit 104-1) to assign the relevant task based on the location or state of the selected mobile drive unit, an indication that the selected mobile drive unit has completed a previously-assigned task, a predetermined schedule, and/or any other suitable consideration. These destinations may be associated with an inventory request the management module 102 is executing or a management objective the management module 102 is attempting to fulfill. For example, the task assignment may define the location of a storage container 106 to be retrieved, a station 108 to be visited, or a location associated with any other task appropriate based on the configuration, characteristics, and/or state of inventory system 100, as a whole, or individual components of the inventory system 100.

As part of completing these tasks the mobile drive units 104 may dock with and transport the storage containers 106 within the workspace 110. The mobile drive units 104 may dock with the storage containers 106 by connecting to, lifting, and/or otherwise interacting with the storage containers 106 in any other suitable manner so that, when docked, the mobile drive units 104 are coupled to and/or support the storage containers 106 and can move the storage containers 106 within the workspace 110. The mobile drive units 104 and storage containers 106 may be configured to dock in any manner suitable to allow a mobile drive unit to move a storage container within workspace 110. In some embodiments, the mobile drive units 104 represent all or portions of the storage containers 106. In such embodiments, the mobile drive units 104 may not dock with the storage containers 106 before transporting the storage containers 106 and/or the mobile drive units 104 may each remain continually docked with a storage container.

In some embodiments, the management module 102 may be configured to communicate the task assignments 116 to the robotic devices 112 and/or computing devices (e.g., scanners, tablets, smartphones, etc.) associated with the personnel 114 to instruct those components to perform one or more tasks. The robotic devices 112, the computing devices associated with the personnel 114, and/or the mobile drive units 104 may individually be configured to provide task performance information to the management module 102. Task performance information may include any suitable data related to the performance of an assigned task. By way of example, a mobile drive unit may send task performance information to the management module 102 indicating that the task of moving a particular storage container to a particular station has been completed. A robotic device and/or a computing device associated with a particular personnel may transmit task performance information to the management module 102 indicating that an item has been placed in or removed from the selected storage container. Generally, any suitable information associated with task performance (e.g., a task identifier, a time of completion, an error code or other indication that the task was unsuccessful, a reason code or other indication as to why task performance was unsuccessful, etc.) may be provided as part of the task performance information.

While the appropriate components of inventory system 100 complete assigned tasks, the management module 102 may interact with the relevant components to ensure the efficient use of space, equipment, manpower, and other resources available to inventory system 100. As one specific example of such interaction, management module 102 is responsible, in particular embodiments, for planning the paths the mobile drive units 104 take when moving within the workspace 110 and for allocating use of a particular portion of the workspace 110 to a particular mobile drive units 104 for purposes of completing an assigned task. In such embodiments, the mobile drive units 104 may, in response to being assigned a task, request a path to a particular destination associated with the task.

Components of the inventory system 100 (e.g., the robotic devices 112, the mobile drive units 104, and/or the computing devices associated with the personnel 114) may provide information to the management module 102 regarding their current state, other components of the inventory system 100 with which they are interacting, and/or other conditions relevant to the operation of the inventory system 100. This may allow the management module 102 to utilize feedback from the relevant components to update algorithm parameters, adjust policies, or otherwise modify its decision-making to respond to changes in operating conditions or the occurrence of particular events.

In addition, while the management module 102 may be configured to manage various aspects of the operation of the components of the inventory system 100, in particular embodiments, the components themselves may also be responsible for decision-making relating to certain aspects of their operation, thereby reducing the processing load on the management module 102.

Thus, based on its knowledge of the location, current state, and/or other characteristics of the various components of the inventory system 100 and an awareness of all the tasks currently being completed, the management module 102 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of the inventory system 100 may be able to support a number of techniques for efficiently executing various aspects of the operation of the inventory system 100. As a result, particular embodiments of the management module 102 may, by implementing one or more management techniques described below, enhance the efficiency of the inventory system 100 and/or provide other operational benefits.

Figure 2:
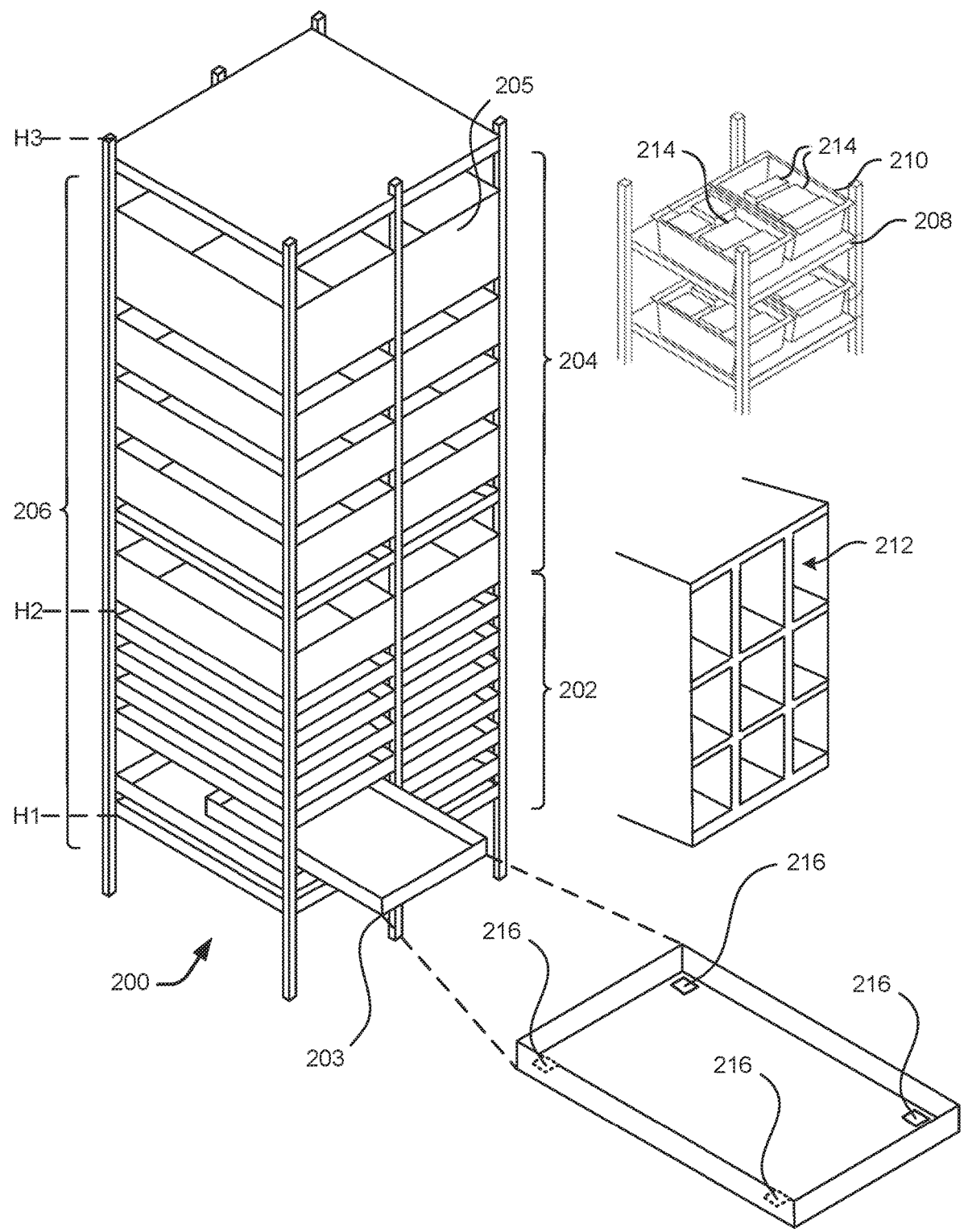
FIGS. 2-4 illustrate exemplary storage containers that may be utilized in particular embodiments the inventory system shown in FIG. 1.

FIG. 2 illustrates an example multi-functional storage container that may be utilized in particular embodiments the inventory system 100 shown in FIG. 1. The storage container 200 may be a multi-functional storage container and may be an example of the storage containers 106 of FIG. 1. As used herein, a multi-functional storage container may include at least one area designated for particular manipulation (e.g., robotic manipulation) and at least one other area designated for another type of manipulation (e.g., manual placement). By way of example, lower area 202 (and/or storage components such as storage component 203) may be designated for manual placement while the upper area 204 (and/or storage components of the upper area 204 such as storage component 205) may be designated for robotic placement. In some embodiments, the storage container 200 may be configured with storage components that differ such that storage components that are to be utilized for robotic placement are optimized for robotic manipulation, while storage components that are to be utilized for manual placement are optimized for manual manipulation (e.g., manipulation by a person). As a non-limiting example, the storage component 205 may be configured to be larger than storage component 203 given a consideration that the robotic devices (e.g., the robotic devices 112 of FIG. 1) may be configured to grasp storage components of the size and type as the storage component 205. It may be the case that the storage component 203 is more difficult for a robotic device to manipulate, but is easily manipulated by manual manipulation. Accordingly, the lower area 202 may be configured with storage components similar to the storage component 203. It should be appreciated that in some embodiments, the upper area 204 and the lower area 202 may overlap. That is, at least some of the storage components 206 may be designated for both robotic placement and manual placement of items.

It should be appreciated that the storage container 200 may be any suitable dimensions. Although the storage container 200 is depicted as having four sides/faces, it should be appreciated that the storage container 200 may include any suitable number of sides/faces of any suitable dimensions. In some embodiments, the storage components of the storage container 200 may be accessible via a single face or via multiple faces. The width and/or depth of the storage container 200 and/or the storage components of the storage container 200 may vary. The dimensions of the storage components of the storage container 200 may be uniform or may vary between storage components. Although depicted with a height that exceeds the width and/or depth, it should be appreciated that the storage container 200 may be configured to have a width and/or depth that is equal or exceeds the height of the storage container 200.

In some embodiments, one or more areas designated for robotic manipulation (e.g., upper area 204) may be situated near the top of the storage container 200 (e.g., between heights H2 and H3). H3 may correspond to a height near (e.g., within 12 inches) of the top-most point of the storage container 200. In some embodiments, one or more areas designated for manual manipulation (e.g., lower area 202) may be situated near the bottom of the storage container 200 (e.g., between the heights H1 and H2). H1 may correspond to a height near (e.g., within 12 inches) of the bottom-most point of the storage container 200. The specific heights H1-H3 may vary depending on the particular embodiment. It should be understood that the ranges of heights or heights set forth herein can include a measurements at any increment or gradient of length, or a subset range of length, therein.

The storage components 206 of the storage container 200 as depicted includes various storage components having a similar type. By way of example, the storage component 203 and the storage component 205 are included in the storage components 206. Each is intended to depict a tray that may be used to contain various items. A tray may vary in size and/or dimensions as indicated by the storage component 203 and the storage component 205. In some embodiments, a tray may be removed from the storage container 200 (e.g., and placed on a nearby surface such as a table). A tray may include a bottom face with four side planes. The storage container 200 may include rails or any suitable structure for receiving the storage components 206. In some embodiments, the storage container 200 may be configured to store multiple sets of trays side by side as depicted in FIG. 2. Although FIG. 2 depicts two columns of trays, it should be appreciated that in other embodiments, the storage container 200 may include any suitable number of tray columns (e.g., 3, 4, 7, etc.). The depths of each storage component within the storage container 200 may vary. By way of example the storage component 203 may be less deep than the storage component 205.

It should be appreciated that the configuration of the storage container 200 and the utilization of storage components 206 (e.g., trays) is intended to be illustrative only and that the specific configuration of the storage container 200 may vary. Additionally, although the storage components 206 are depicted in FIG. 2 as being accessible through one face of the storage container 200, it should be appreciated that the storage container 200 may include storage components accessible through any suitable face of the storage container 200.

In some embodiments, the storage container 200 may include any suitable combination of trays, shelves (e.g., the shelf 208), bins (e.g., bin 210, also referred to as a "tote"), alcoves (e.g., the alcove 212), or any suitable combination of the above. A shelf may include a horizontal plane of the storage container 200 on which items (e.g., items 214) may be placed directly. A bin (e.g., bin 210) may include any suitable rigid or semi-rigid structure within which items 214 may be placed. A bin may be placed on a shelf of the storage container 200. An alcove (e.g., the alcove 212) may be an enclosed receptacle that is enclosed on all sides except one. An item may be placed within the alcove via access provided via a face of the storage container 200. The specific dimensions associated with the storage components (e.g., shelf 208, bin 210, alcove 212, storage components 203 and 205) may vary according to the needs of the system with respect to the types of items to be stored, the capabilities of the robotic devices 112 of FIG. 1, the capabilities of each personnel 114, and the like.

In some embodiments, any of the storage components of a the storage container 200 (or any storage container discussed herein) may include one or more physical markers (e.g., physical markers 216). The physical markers 216 may be arranged on or within the storage component in any suitable manner. Each physical marker 216 may indicate a subsection of the storage component. By way of example, the storage component 203 may include four physical markers 216 that are arranged generally in the four corners of the storage component 203. Each physical marker of the 216 may indicate a subsection of the storage component 203 corresponding to an area spanning one fourth of the storage component 203. In some embodiments, the storage component 203 may include more or fewer subsections corresponding to more or fewer physical markers. As described herein, the physical markers may be utilized to identify a subsection within the storage component 203 at which an item is to be placed or from which an item is to be removed.

Figure 3:
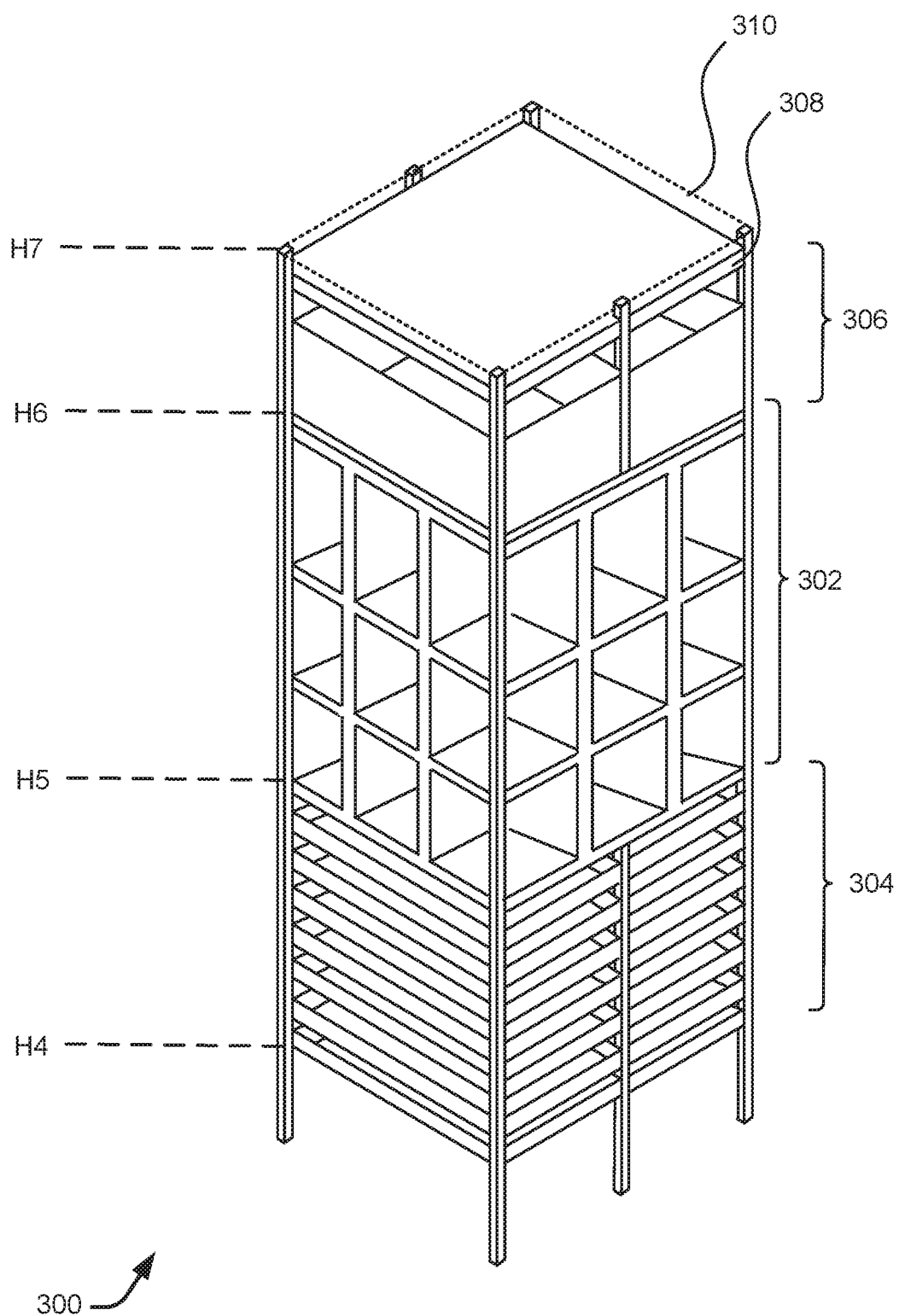

FIG. 3 illustrates another example storage container 300 that may be utilized in particular embodiments the inventory system 100 shown in FIG. 1. The storage container 300 may be a multi-functional storage container and may be an example of the storage containers 106 of FIG. 1 and/or the storage container 200 of FIG. 2.

As depicted in FIG. 3, the storage container 300 include middle area 302, lower area 304, and upper area 306. In some embodiments, the middle area 302 may include a number of alcoves (e.g., the alcove 212 of FIG. 2). Although in other embodiments, the middle area 302 may include any suitable number and/or combination of any suitable type of storage components (e.g., bins, shelves, alcoves, trays, etc.). In some embodiments, the middle area 302 may be associated with a designation indicating that the storage components within the middle area 302 (and/or the storage components within the middle area 302) are to be utilized for manual manipulation (e.g., manual placement and/or retrieval of an item). Although a single area (e.g., middle area 302) is depicted in FIG. 3 as being designated for manual manipulation, it should be appreciated that in other embodiments, the storage container 300 may include additional areas designated for manual manipulation. It should also be appreciated that the particular type of storage component within the middle area 302 may differ from the storage components depicted. That is, the middle area 302 may include any suitable number and type of storage components (e.g., a bin, a shelf, an alcove, a tray, or any suitable combination of the above).

The storage container 300 may include lower area 304 and upper area. Lower area 304 may include any suitable number of trays (e.g., a tray depicted as storage component 203 of FIG. 2). Upper area 306 may similarly include any suitable number of trays (e.g., a tray depicted as storage component 205 of FIG. 2). In the example depicted in FIG. 3, lower area 304 and upper area 306 may be associated with a designation indicating that the storage components within the middle area 302 (or the storage components within the area) are to be utilized for robotic manipulation (e.g., robotic placement by the robotic devices 112 of FIG. 1). It should be appreciated that in some embodiments, more or fewer areas may be included in the storage container 300 that may each be designated for robotic manipulation. It should also be appreciated that the particular type of storage component within the lower area 304 and upper area 306 may differ from the storage components depicted. That is, the lower area 304 and/or upper area 306 may include any suitable number and type of storage components (e.g., a bin, a shelf, an alcove, a tray, or any suitable combination of the above). As depicted in FIG. 3, upper area 306 may include an additional storage component such as a shelf 308 (with or without side panels 310) on which one or more items may be placed (e.g., via a robotic device placing the item from an overhead trajectory). In some embodiments, one or more storage components such as one or more trays and/or one or more bins may be placed atop the shelf 308. In some embodiments, items may be placed directly on shelf 308. Just as other storage components discussed in FIG. 2 may include one or more physical markers (e.g., the physical markers 216 of FIG. 2) that identify subsection of the storage component, so too may the shelf 308. The side panels 310, if include, may be any suitable height.

In some embodiments, one or more areas designated for robotic manipulation (e.g., lower area 304) may be situated near the bottom of the storage container 300 (e.g., between heights H4 and H5). In some embodiments, one or more areas designated for robotic manipulation (e.g., upper area 306) may be situated near the top of the storage container 300 (e.g., between the heights H6 and H7). In some embodiments, one or more areas associated with manual manipulation (e.g., middle area 302) may be situated within a middle section of the storage container 300 (e.g., between the heights H5 and H6). The specific heights H4-H7 may vary depending on the particular embodiment. As a non-limiting example, H4 may be a height that is near (e.g., within 12 inches) of the bottom of the storage container 300), H5 may be a height within a range of 31-35 inches (e.g., 33 inches), H6 may be a height within a range of 58-65 inches (e.g., 62 inches), H7 may be height that is near (e.g., within 12 inches) of the top-most point of the storage container 300. H5 and H6 may be selected, for example, based at least in part on a determination that an average person has a reach within H5 and H6 that does not require bending or overreaching. By way of example, middle area 302 of FIG. 3 may be situated between 33 inches from the bottom of the storage container 300 to 62 inches from the bottom of the storage container 300 in order to ensure that items being manually placed within the middle area 302 do not require some threshold of people (e.g., 95% of the population) to bend, overreach, or utilize a ladder and/or step stool to reach any suitable storage component within the middle area 302.

As depicted in FIG. 3, some storage components may be accessible via a first face of the storage container 300, while other storage components may be accessible from a different face of the storage container 300. The storage container 300 may include any suitable number of faces (e.g., 3, 4, etc.) through which any suitable number of storage components may be accessible.

Figure 4:
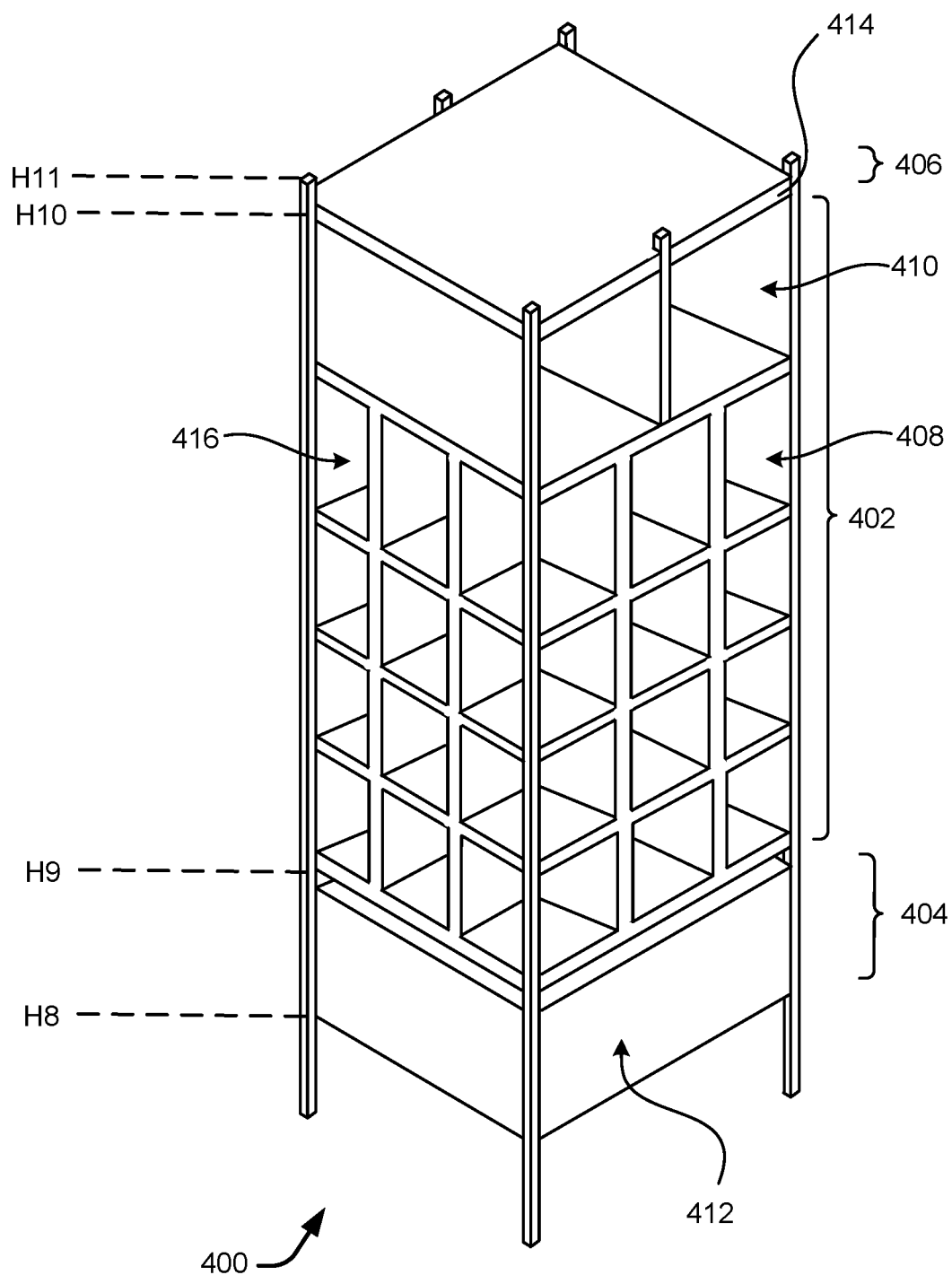

FIG. 4 illustrates yet another example storage container 400 that may be utilized in particular embodiments the inventory system 100 shown in FIG. 1. The storage container 400 may be a multi-functional storage container and may be an example of the storage containers 106 of FIG. 1 and/or the storage container 200 of FIG. 2.

As depicted in FIG. 4, the storage container 400 include middle area 402, lower area 404, and upper area 406. In some embodiments, the middle area 402 may include a number of alcoves (e.g., the alcove 212 of FIG. 2). Although in other embodiments, the middle area 402 may include any suitable number and/or combination of any suitable type of storage components (e.g., bins, shelves, alcoves, trays, etc.). In some embodiments, the middle area 402 may be associated with a designation indicating that the storage components within the middle area 402 (and/or the storage components within the middle area 402) are to be utilized for manual manipulation (e.g., manual placement and/or retrieval of an item). As depicted within middle area 402, the dimensions of the storage components (the alcoves depicted) may vary in dimension. For example, alcove 408 may have different dimensions than the alcove 410. Although a single area (e.g., middle area 402) is depicted in FIG. 4 as being designated for manual manipulation, it should be appreciated that in other embodiments, the storage container 400 may include additional areas designated for manual manipulation. It should also be appreciated that the particular type of storage component within the middle area 402 may differ from the storage components depicted. That is, the middle area 402 may include any suitable number and type of storage components (e.g., a bin, a shelf, an alcove, a tray, or any suitable combination of the above).

The storage container 400 may include lower area 404 and upper area 406. Lower area 404 may include any suitable number of trays (e.g., storage component 412, an example of the storage component 203 of FIG. 2). In some embodiments, the storage component 412 may span the width of a face of the storage container 400. In other embodiments, the storage component 412 may span less than the width of the face of the storage container 400. In some embodiments, the storage component 412 may be an example of a drawer that slides open but is not removable as would be the case for a tray. As depicted in FIG. 4, upper area 406 may include a storage component such as a shelf 414 (depicted without side panels, although side panels of any suitable height may be utilized) on which one or more items may be placed (e.g., by a robotic device from an overhead trajectory). In some embodiments, one or more storage components such as one or more trays and/or one or more bins may be placed atop the shelf 414. In some embodiments, items may be placed directly on shelf 414. Just as other storage components discussed in FIG. 2 may include one or more physical markers (e.g., the physical markers 216 of FIG. 2) that identify subsection of the storage component, so too may the shelf 414.

In the example depicted in FIG. 4, lower area 404 and upper area 406 may be associated with a designation indicating that the storage components within the lower area 404 and the upper area 406 (or the storage components within the area) are to be utilized for robotic manipulation (e.g., robotic placement by the robotic devices 112 of FIG. 1). It should be appreciated that in some embodiments, more or fewer areas may be included in the storage container 400 that may each be designated for robotic manipulation. It should also be appreciated that the particular type of storage component within the lower area 404 and the upper area 406 may differ from the storage components depicted. That is, the lower area 404 and the upper area 406 may include any suitable number and type of storage components (e.g., a bin, a shelf, an alcove, a tray, or any suitable combination of the above).

In some embodiments, one or more areas designated for robotic manipulation (e.g., lower area 404) may be situated near the bottom of the storage container 400 (e.g., between heights H8 and H9). H8 may be the same value or a different value as H4 of FIG. 3. H9 may be a same value or a different value as H5 of FIG. 3. In some embodiments, one or more areas designated for robotic manipulation (e.g., upper area 406) may be situated near the top of the storage container 400 (e.g., between the heights H10 and H11). H10 and H11 may be the same value or a different value as H6 and H7 of FIG. 3, respectively. In some embodiments, one or more areas associated with manual manipulation (e.g., middle area 402) may be situated within a middle section of the storage container 400 (e.g., between the heights H9 and H10). The specific heights H8-H11 may vary depending on the particular embodiment. As a non-limiting example, H8 may be a height that is near (e.g., within 15 inches) of the bottom of the storage container 400), H9 may be a height within a range of 31-35 inches (e.g., 32 inches), H10 may be a height within a range of 58-65 inches (e.g., 63 inches), H11 may be height that is near (e.g., within 6 inches) of the top-most point of the storage container 400. H9 and H10 may be selected, for example, based at least in part on a determination that an average person being has a reach within H10 and H11 that does not require bending or overreaching. By way of example, middle area 402 of FIG. 4 may be situated between 31 inches from the bottom of the storage container 400 to 63 inches from the bottom of the storage container 400 in order to ensure that items being manually placed within the middle area 402 do not require some threshold of people (e.g., 98% of the population) to bend, overreach, or utilize a ladder and/or step stool to reach any suitable storage component within the middle area 402.

As depicted in FIG. 4, some storage components (e.g., alcove 408) may be accessible via a first face of the storage container 400, while other storage components (e.g., alcove 416) may be accessible from a different face of the storage container 400. The storage container 400 may include any suitable number of faces (e.g., 3, 4, etc.) through which any suitable number of storage components may be accessible.

Figure 5:
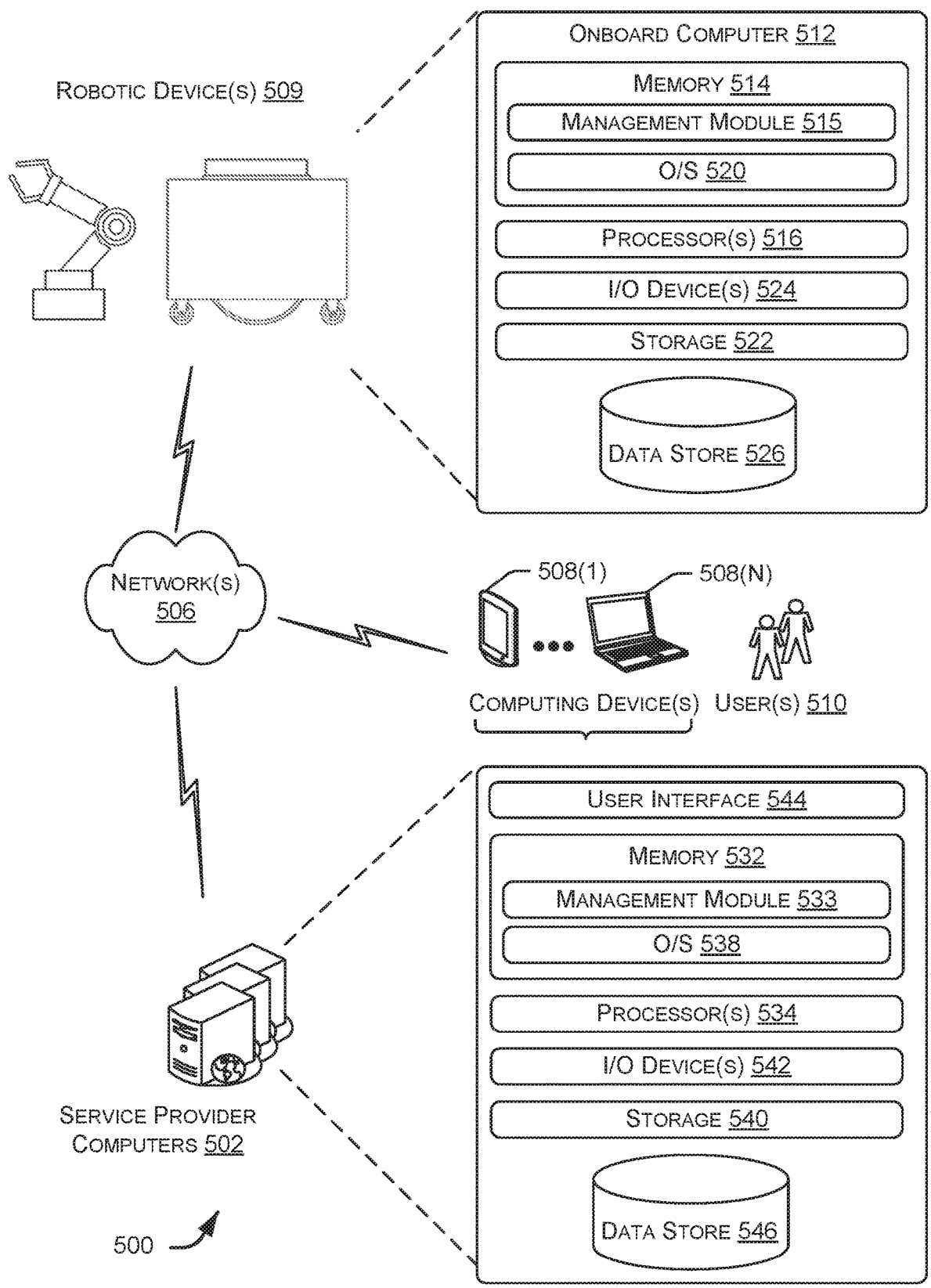
FIG. 5 is an example system architecture for implementing aspect of the inventory system, in accordance with at least one embodiment.

FIG. 5 is an example system architecture 500 for implementing aspect of the inventory system 100 of FIG. 1, in accordance with at least one embodiment. The architecture 500 may include a service provider computers 502. The service provider computers 502 may support an electronic marketplace (not shown) and interface with purchase and delivery services of the electronic marketplace. In this manner, the service provider computers 502 may coordinate receiving, storing, packaging, and shipping of items in a warehouse operated by, or on behalf of, the electronic marketplace provider. In some examples, the service provider computers may be a stand-alone service operated on its own or in connection with an electronic marketplace. In either example, the service provider computers 502 may be in communication with the robotic device(s) 509 (e.g., the mobile drive units 104 of FIG. 1, the robotic devices 112 of FIG. 1) via one or more network(s) 506 (hereinafter, "the network 506"). The network 506 may include any one or a combination of many different types of networks, such as cable networks, the Internet, wireless networks, cellular networks, radio networks, and other private and/or public networks.

Computing devices 508(1)-508(N) may also be in communication with the service provider computers 502 via the network 506. The computing devices 508 may be operable by one or more users 510 (hereinafter, "the users 510") to access the service provider computers 502 via the network 506. The computing device 508 may be any suitable device (e.g., portable or non-portable) capable of communicating with the network 506. For example, the computing devices 508 may be any suitable computing device such as, but not limited to, a mobile phone, a smart phone, a personal digital assistant (PDA), a laptop computer, a thin-client device, a tablet PC, a desktop computer, a scanner, or other computing device. The computing devices 508 may include similar components provided in the onboard computer 512, including one or more processors, memory, I/O devices, one or more data stores, additional storage, an operating system, and, in particular embodiments, a management module similar to the management module 515. The functionality provided by the management module 515 discussed below with respect to the mobile drive units 104 may similar be provided by a management module operating on a computing device of the computing devices 508. Likewise, the functionality of management module 533 may similarly be provided by a computing device of the computing devices 508. Any of the management modules of FIG. 5 (e.g., the management module 515, the management module 533, the management module of the computing devices 508, etc.) may be an example of the management module 102 of FIG. 1. Any suitable portion of the functionality described herein with respect to the management module 102 may be provided by any suitable combination of the management modules of FIG. 5. In some embodiments, the computing device may be operated by a user (e.g., a person of the personnel 114 of FIG. 1) within a storage facility (e.g., the workspace 110 of FIG. 1).

Turning now to the details of the robotic device(s) 509. The robotic device(s) 509 may be examples of the robotic devices 112 and/or the mobile drive units 104 of FIG. 1. In some embodiments, the robotic device(s) 509 may include an onboard computer 512 including at least one memory 514 and one or more processing units (or processor(s)) 516. The processor(s) 516 may be implemented as appropriate in hardware, computer-executable instructions, software, firmware, or combinations thereof. Computer-executable instruction, software or firmware implementations of the processor(s) 516 may include computer-executable or machine-executable instructions written in any suitable programming language to perform the various functions described. The memory 514 may include more than one memory and may be distributed throughout the onboard computer. The memory 514 may store program instructions (e.g. the management module 515, and example of the management module 102 of FIG. 1) that are loadable and executable on the processor(s) 516, as well as data generated during the execution of these programs.

Depending on the configuration and type of memory including the management module 515, the memory 514 may be volatile (such as random access memory (RAM)) and/or non-volatile (such as read-only memory (ROM), flash memory, or other memory). The memory 514 may also include additional removable storage and/or non-removable storage including, but not limited to, magnetic storage, optical discs, and/or tape storage. The disk drives and their associated computer-readable media may provide non-volatile storage of computer-readable instructions, data structures, program modules, and other data for the computing devices. In some implementations, the memory 514 may include multiple different types of memory, such as static random access memory (SRAM), dynamic random access memory (DRAM), or ROM. Turning to the contents of the memory 514 in more detail, the memory 514 may include an operating system 520 and one or more application programs, modules or services for implementing the features disclosed herein including at least the management module 515.

In some examples, the onboard computer may also include additional storage 522, which may include removable storage and/or non-removable storage. The additional storage 522 may include, but is not limited to, magnetic storage, optical disks, and/or tape storage. The disk drives and their associated computer-readable media may provide non-volatile storage of computer-readable instructions, data structures, program modules, and other data for the computing devices.

The memory 514 and the additional storage 522, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the onboard computer 512. The modules of the onboard computer 512 may include one or more components. The onboard computer 512 may also include input/output (I/O) device(s) 524 and/or ports, such as for enabling connection with a keyboard, a mouse, a pen, a voice input device, a touch input device, a display, speakers, a printer, or other I/O device. The I/O device(s) 524 may enable communication with the other systems of the robotic device(s) 509.

The onboard computer 512 may also include data store 526. The data store 526 may include one or more databases, data structures, or the like for storing and/or retaining information associated with the robotic device(s) 509 such as any suitable data related to task assignments, instructions, and/or task performance information.

The service provider computers 502, perhaps arranged in a cluster of servers or as a server farm, may host web service applications. These servers may be configured to host a website (or combination of websites) viewable via the computing devices 508. In at least one example, the service provider computers 502 may be configured to manage the robotic devices 509 as part of an inventory system (e.g., the inventory system 100). The service provider computers 502 may include at least one memory 532 and one or more processing units (or processor(s)) 534. The processor(s) 534 may be implemented as appropriate in hardware, computer-executable instructions, software, firmware, or combinations thereof. Computer-executable instruction, software or firmware implementations of the processor(s) 534 may include computer-executable or machine-executable instructions written in any suitable programming language to perform the various functions described.

The memory 532 may include more than one memory and may be distributed throughout the service provider computers 502. The memory 532 may store program instructions (e.g., management module 533) that are loadable and executable on the processor(s) 534, as well as data generated during the execution of these programs. Depending on the configuration and type of memory including the management module 533, the memory 532 may be volatile (such as random access memory (RAM)) and/or non-volatile (such as read-only memory (ROM), flash memory, or other memory). The service provider computers 502 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 532 may include multiple different types of memory, such as static random access memory (SRAM), dynamic random access memory (DRAM), or ROM.

Turning to the contents of the memory 532 in more detail, the memory 532 may include an operating system 538 and one or more application programs, modules or services for implementing the features disclosed herein including at least the management module 536. The management module 536, in some examples, may function similarly to the management module 515 with respect to determining tasks for the robotic device(s) 509. For example, when the robotic device(s) 509 are in network communication with the service provider computers 502, the robotic device(s) 509 may receive at least some instructions from the service provider computers 502 as the management module 536 is executed by the processors 534. In some examples, the robotic devices may individually execute the management module 515 (e.g., that implement the features described with respect to task assignment, task performance, and/or peer-to-peer communication features) to operate independent of the service provider computers 502.

In some examples, the service provider computers 502 may also include additional storage 540, which may include removable storage and/or non-removable storage. The additional storage 540 may include, but is not limited to, magnetic storage, optical disks, and/or tape storage. The disk drives and their associated computer-readable media may provide non-volatile storage of computer-readable instructions, data structures, program modules, and other data for the computing devices.

The memory 532 and the additional storage 540, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the service provider computers 502. The modules of the service provider computers 502 may include one or more components. The service provider computers 502 may also include input/output (I/O) device(s) 542 and/or ports, such as for enabling connection with a keyboard, a mouse, a pen, a voice input device, a touch input device, a display, speakers, a printer, or other I/O device.

In some examples, the service provider computers 502 may include a user interface 544. The user interface 544 may be utilized by an operator, or other authorized user to access portions of the service provider computers 502. In some examples, the user interface 544 may include a graphical user interface, web-based applications, programmatic interfaces such as application programming interfaces (APIs), or other user interface configurations. The service provider computers 502 may also include data store 546. The data store 546 may include one or more databases, data structures, or the like for storing and/or retaining information associated with the service provider computers 502.

In at least one embodiment, the management module 515 and/or the management module 533 (hereinafter, the "management modules") may provide the functionality of the management module 102 of FIG. 1 from a mobile drive unit centric or server centric viewpoint, respectively.

Figure 6:
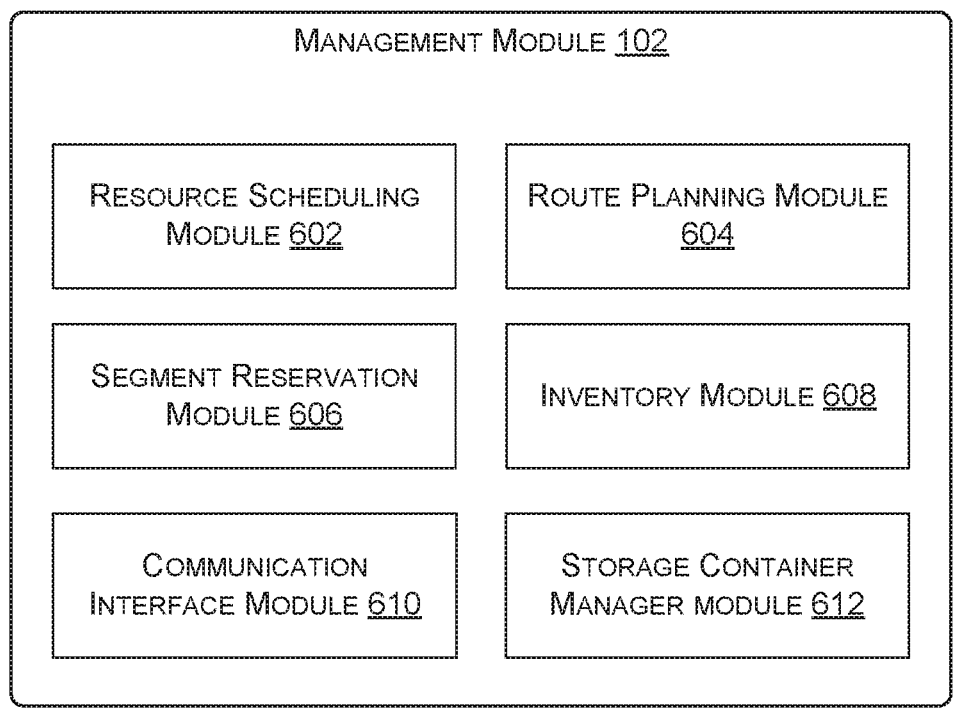
FIG. 6 illustrates in greater detail the components of an example management module that may be utilized in particular embodiments of the inventory system shown in FIG. 1.

FIG. 6 illustrates in greater detail the components of a particular embodiment of a management module (e.g., the management module 102 of FIG. 1, the management module 515 or 533 of FIG. 5, etc.). As shown, the example embodiment includes a resource scheduling module 602, a route planning module 604, a segment reservation module 606, an inventory module 608, a communication interface module 610, and a storage container manager module 612. As discussed above, the management module 102 may represent a single component, multiple components located at a central location within inventory system 100, or multiple components distributed throughout inventory system 100. For example, management module 102 may represent components of one or more robotic devices (e.g., the robotic device(s) 509 of FIG. 5) that are capable of communicating information between the one another and/or coordinating movement between one another (e.g., between two mobile drive units, robotic devices, etc.) within the workspace 110 of FIG. 1. In general, the management module 102 may include any appropriate combination of hardware and/or software suitable to provide the described functionality.

In at least one embodiment, the storage container manager module 612 may be configured to obtain and/or maintain configuration data associated with one or more storage containers of a storage facility. By way of example, the configuration data may specify one or more portions of a storage container that are designated for manual storage and/or one or more portions of the storage container that are designated for robotic storage. These portions may correspond to any suitable area and/or any suitable number of storage components (e.g., bins, trays, shelves, totes, drawers, etc.) of the storage container. The configuration data may be predetermined and may be obtained by the storage container management module 612 from any suitable source. The configuration data may be in any suitable form such as a data object, a data structure, a mapping, or any suitable electronic container from which designations of corresponding storage containers/components of storage containers may be specified. The storage container management module 612 may be configured to select any suitable storage component of a storage container for storing an item. In some embodiments, the storage container management module 612 may select the storage component based at least in part on any suitable attribute associated with an item and/or based at least in part on a determination of particular storage components within the storage container that are available to store the item.

In at least one embodiment, the storage container manager module 612 may be configured to determine whether the item is to be manually placed or robotically placed. By way of example, the storage container manager module 612 may request item attributes associated with the item from any suitable source (e.g., from the inventory module 608). The item attributes may include weight, item category, item material, packaging dimensions, or any suitable attribute of the item. In some embodiments, the storage container manager module 612 may utilize the item attributes to determine a placement method (e.g., manual placement or robotic placement). As a simplistic example, robotic placement may be selected for items over a particular weight threshold. As another example, manual placement may be selected for very small items, lightweight items, and/or fragile items. The storage container manager module 612 may utilize any suitable predetermined protocol for identifying whether an item should be manually placed or robotically placed that may be based at least in part on any suitable factor such as availability of personnel, availability of robotic devices within the storage facility, item attributes, storage components available to store the item, and the like.

In at least one embodiment, the resource scheduling module 602 may be configured to process received inventory requests and generate one or more assigned tasks to be completed by the components of the inventory system 100. The resource scheduling module 602 may also select one or more appropriate components (e.g., one or more robotic devices 509, one or more personnel corresponding to computing devices 508, etc.) for completing the assigned tasks (e.g., movement of a storage container, storage/retrieval of an item, etc.) and may communicate, via the communication interface module 5610, the assigned tasks to the relevant components. In some examples, the resource scheduling module 602 may select the one or more appropriate components (e.g., robotic devices such as robotic arms, MDUs, personnel, etc.) based on a location of the robotic device (e.g., as determined by the position sensor of the robotic device, as determined by a position sensor of a computing device corresponding to a person, etc.). The resource scheduling module 602 may, in some embodiments, invoke the functionality of the storage container manager module 612 to determine a suitable storage component of a storage container to store the item. Alternatively, the storage container manager module 612 may be invoked on receipt of an inventory request. According to some embodiments, the storage container management module 612 may invoke the functionality of the resource scheduling module 602 to identify an appropriate resource (e.g., one or more robotic devices 509, one or more personnel corresponding to computing devices 508, etc.) for completing a task involving the item (e.g., storage and/or retrieval of the item within/from the storage component selected by the storage container management module 612).

In at least one embodiment, the route planning module 604 may receive route requests from the robotic devices (e.g., mobile drive units 104). These route requests may identify one or more destinations associated with a task (e.g., moving a storage container, storing/retrieving an item within/from a storage container, etc.) the requesting robotic device is executing. In response to receiving a route request, the route planning module 604 may generate a path to one or more destinations identified in the route request. The route planning module 604 may implement any appropriate algorithms utilizing any appropriate parameters, factors, and/or considerations to determine the appropriate path. After generating an appropriate path, the route planning module 604 may transmit a route response identifying the generated path to the requesting robotic device using the communication interface module 610.

In at least one embodiment, the segment reservation module 606 may receive reservation requests from the robotic devices (e.g., mobile drive units 104) attempting to move along paths generated by the route planning module 604. These reservation requests may indicate a request for the use of a particular portion of the workspace 110 (referred to herein as a "segment") to allow the requesting robotic device to avoid collisions with other robotic devices while moving across the reserved segment. In response to received reservation requests, segment reservation module 606 may transmit a reservation response granting or denying the reservation request to the requesting robotic device using the communication interface module 610.

In at least one embodiment, the inventory module 608 may maintain information about the location and number of inventory items in the inventory system 100 of FIG. 1. Information can be maintained about the number of inventory items in a particular storage container 106, and the maintained information can include the location of those inventory items in the storage container 106. In some embodiments, the storage container management module 612 may request item information from the inventory module 608 in order to ascertain one or more attributes associated with an item to be stored and/or retrieved. At least some of these obtained item attributes may be utilized by the storage container management module 612 in order to select a storage container and/or a storage component of a storage container to be utilized to store the item.

In at least one embodiment, the communication interface module 610 may facilitate communication between management module 102 and other components of inventory system 100, including reservation responses, reservation requests, route requests, route responses, and task assignments. These reservation responses, reservation requests, route requests, route responses, and task assignments may represent communication of any form appropriate based on the capabilities of management module 102 and may include any suitable information. Depending on the configuration of management module 102, communication interface module 610 may be responsible for facilitating either or both of wired and wireless communication between management module 102 and the various components of inventory system 100. In particular embodiments, management module 102 may communicate using communication protocols such as 802.11, Bluetooth, or Infrared Data Association (IrDA) standards. Furthermore, management module 102 may, in particular embodiments, represent a portion of a robotic device (e.g., robotic devices 112, mobile drive units 104, etc.) or other components of inventory system 100. In such embodiments, communication interface module 610 may facilitate communication between management module 102 and other parts of the same system component.

In general, the resource scheduling module 602, the route planning module 604, the segment reservation module 606, the inventory module 608, the communication interface module 610, and the storage container manager module 612 may each represent any appropriate hardware and/or software suitable to provide the described functionality. In addition, as noted above, management module 102 may, in particular embodiments, represent multiple different discrete components and any or all of the resource scheduling module 602, the route planning module 604, the segment reservation module 606, the inventory module 608, the communication interface module 610, and/or the storage container manager module 612 may represent components physically separate from the remaining elements of management module 102. Moreover, any two or more of the resource scheduling module 602, the route planning module 604, the segment reservation module 606, the inventory module 608, the communication interface module 610, and/or the storage container manager module 612 may share common components.

Figure 7:
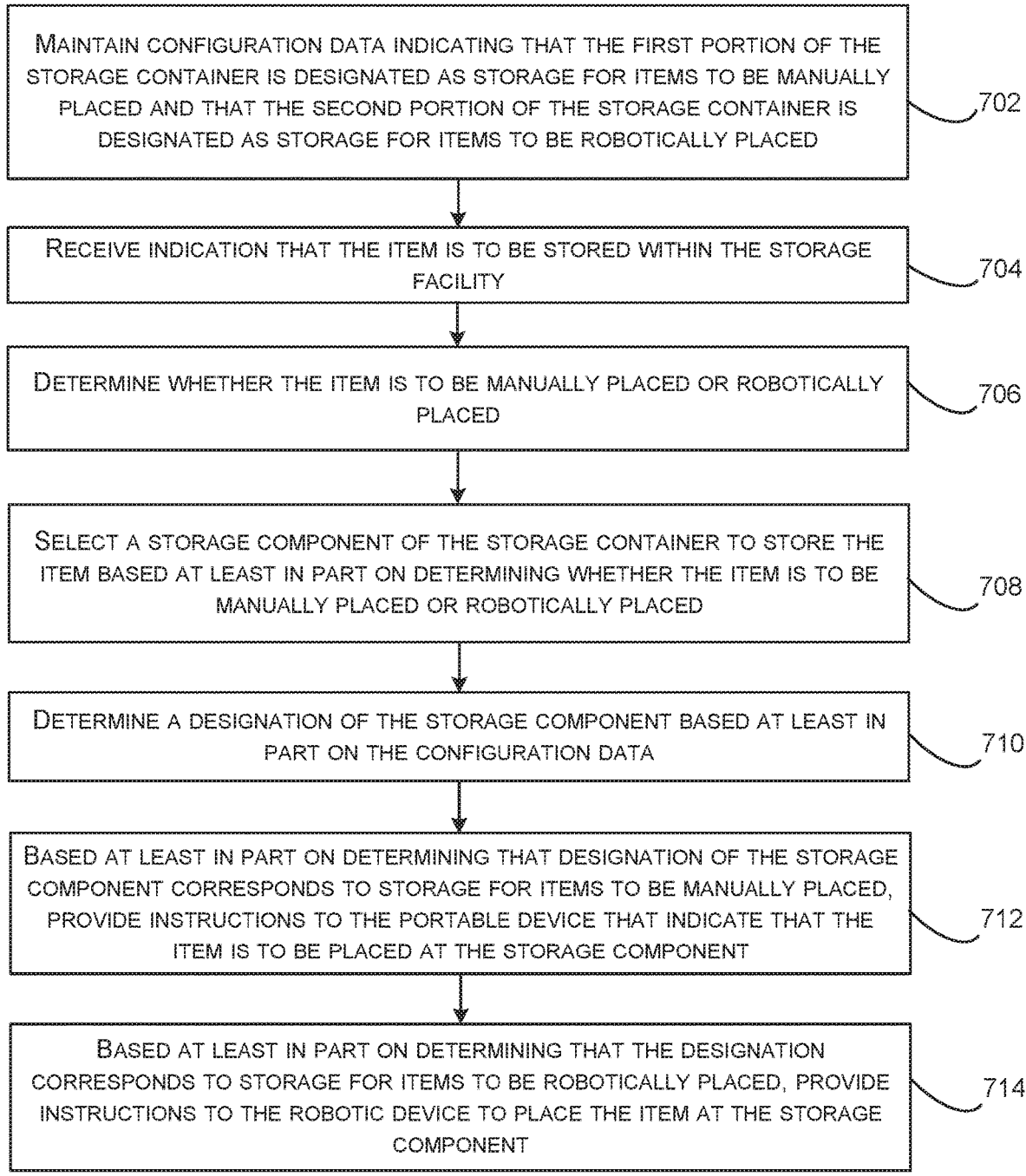
FIG. 7 is a flowchart illustrating an example method for utilizing a multi-functional storage container for storing an item, in accordance with at least one embodiment.

FIG. 7 is a flowchart illustrating an example method 700 for utilizing a multi-functional storage container for storing an item, in accordance with at least one embodiment. The method may be performed by a system (e.g., the inventory system 100 of FIG. 1, the system 1100 of FIG. 11, etc.). The system may comprise a storage container of a storage facility or more than one storage container. A storage container may comprise a first portion designated as storage for manually-placed items and a second portion designated as storage for robotically-placed items. In some embodiments, the first portion of the storage container may comprise a first set of storage components, and the second portion of the storage container may comprise a second set of storage components. The system may further comprise one or more robotic devices (e.g., robotic arms configured with an end effector such as a grasping mechanism or the like) configured to transfer an item to the storage container. In some embodiments, the system may further comprise a portable device (e.g., a computing device of the computing devices 508 of FIG. 5) configured to receive instructions associated with placement of an item within the storage container. The portable device may be accessible to any suitable number of operators (e.g., personnel 114 of FIG. 1). In some embodiments, the system may comprise a management module (e.g., the management module 102) which may be configured to execute the operations of method 700.

The method 700 may being at block 702 where configuration data may be maintained (e.g., by the storage container manager module 612 of FIG. 6). The configuration data may be in any suitable form such as a mapping or other data structure that enables designations associated with various storage components to be maintained. In some embodiments, the configuration data may indicate that the first portion of the storage container (e.g., storage components corresponding to middle area 302 of FIG. 3) is designated as storage for items to be manually placed and that the second portion of the storage container (e.g., storage components corresponding to lower area 304 and upper area 306 of FIG. 3) is designated as storage for items to be robotically placed. Within the configuration data, the designation may be associated with an area which in turn may be associated with one or more storage components, or the designation may be associated with a single storage component.

At 704, an indication that the item is to be stored within the storage facility may be received (e.g., by the storage container manager module 612, the resource scheduling module 602, or any suitable module discussed above in connection with FIG. 6). By way of example, an item may be scanned upon receipt within the storage facility. Item attributes of the item may be provided to the storage container manager module 612 at any suitable time indicating that the item is to be stored within the storage facility.

At 706, the management module may determine whether the item is to be manually placed or robotically placed. As discussed throughout, the management module may determine that an item is to manually placed, or conversely, robotically placed based at least in part on any suitable factor such as the attributes associated with the item, availability of personnel to store the item, availability of robotic devices to store the item, availability of storage components to store to the item, or any suitable combination of the above.

At 708, a storage component of the storage container may to store the item may be selected based at least in part on determining whether the item is to be manually placed or robotically placed. By way of example, if the item is to be manually placed, the storage container manager module 612 may be configured to consult configuration data associated with the storage containers of the storage facility to identify a storage container that is designated for manual placement and for which space is available to store the item. Similarly, if the item is to be robotically placed, the storage container manager module 612 may be configured to consult the configuration data associated with the storage containers of the storage facility to identify a storage container that is designated for robotic placement and for which space is available to store the item.

At 710, a designation of the storage component selected at 708 may be determined based at least in part on the configuration data. For example, the storage container manager module 612 may identify that the selected storage component is designated for robotic placement or for manual placement.

At 712, based at least in part on determining that designation of the storage component corresponds to storage for items to be manually placed, a component of the management module (e.g., the resource scheduling module 602) may provide instructions to a portable device (e.g., operated by one or more of the personnel 114 of FIG. 1) that indicate that the item is to be placed at the storage component.

Alternatively, at 714, based at least in part on determining that the designation corresponds to storage for items to be robotically placed, a component of the management module (e.g., the resource scheduling module 602) may provide instructions to a robotic device (e.g., a robotic device of the robotic devices 112 of FIG. 1) to place the item at the storage component.

Figure 8:
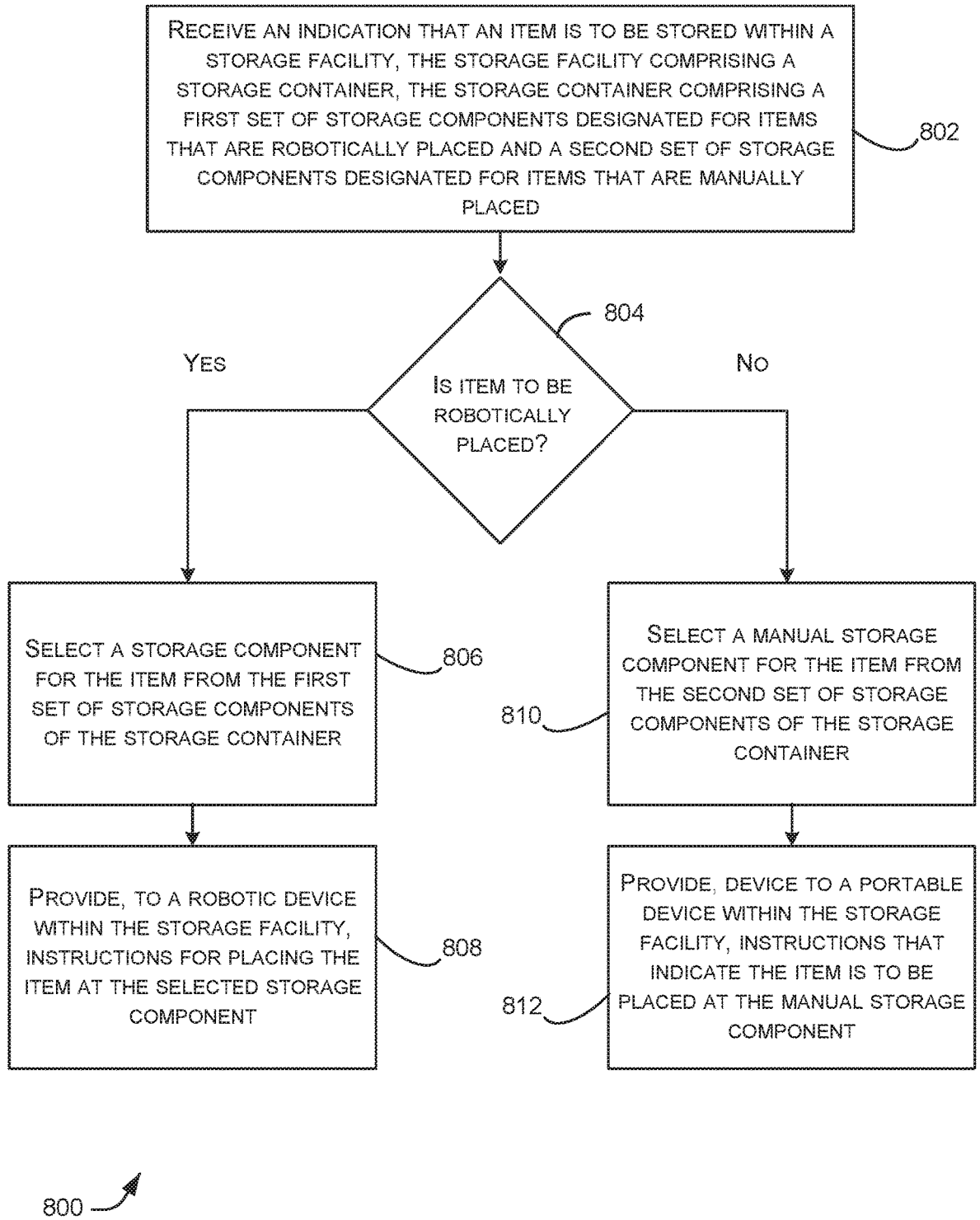
FIG. 8 is a flowchart illustrating another example method for utilizing a multi-functional storage container for storing an item, in accordance with at least one embodiment.

FIG. 8 is a flowchart illustrating another example method 800 for utilizing a multi-functional storage container for storing an item, in accordance with at least one embodiment.

The method may be performed by the service provider computers 502 (or any suitable device executing the functionality of the management module 102 of FIGS. 1 and 6). It should be appreciated that more or fewer operations than those depicted in FIG. 8 may be included in the method 800 and that the operations of method 800 may be executed in any suitable order.

The method may being at 802, where an indication that an item is to be stored within a storage facility may be received (e.g., by the storage container manager module 612 of FIG. 6). As discussed throughout, the storage facility may comprise a storage container. In some embodiments, the storage container may comprise a first set of storage components designated for items that are robotically placed and a second set of storage components designated for items that are manually placed.

The method may proceed to decision block 804 where it may be determined if the item is to be robotically placed. In some embodiments, this determination may be performed by the storage container manager module 612 based on any suitable factors such as attributes associated with the item, personnel available to store the item, robotic devices available to store the item, storage components of one or more storage containers that are available to store the item, or any suitable combination of the above.

In response to determining that the item is to be robotically at decision block 804, the method 800 may proceed to 806, where a storage component for the item may be selected from the first set of storage components of the storage container.

At 808, instructions for placing the item at the selected storage component may be provided (e.g., by the resource scheduling module 602 of FIG. 6) to a robotic device of the storage facility. The robotic device may be selected (e.g., by the resource scheduling module 602) based on any suitable factor such as various tasks being performed by other components of the storage facility, location of the storage container, location of the robotic device, or any other suitable factor.

In response to determining that the item is to be robotically at decision block 804, the method 800 may proceed to 810, where a manual storage component for the item may be selected from the second set of storage components of the storage container.

At 812, instructions for placing the item at the manual storage component may be provided (e.g., by the resource scheduling module 602 of FIG. 6) to a portable device of the storage facility. In some embodiments, the portable device may be assigned to and/or accessible to an operator. The portable device/operator may be selected (e.g., by the resource scheduling module 602) based on any suitable factor such as various tasks being performed by other components of the storage facility, location of the storage container, location of the portable device, or any other suitable factor.

Figure 9:
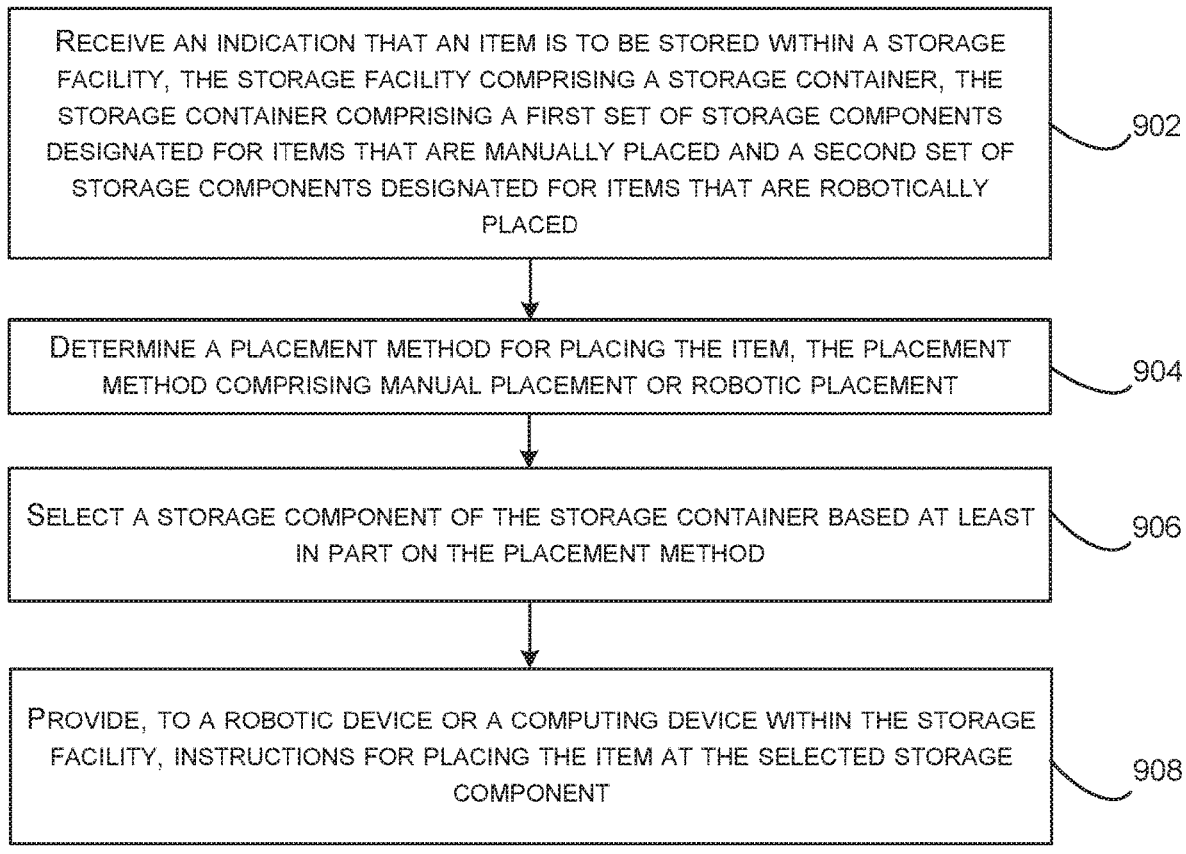
FIG. 9 is a flowchart illustrating still one further example method for utilizing a multi-functional storage container for storing an item, in accordance with at least one embodiment 1, in accordance with at least one embodiment.

FIG. 9 is a flowchart illustrating still one further example method 900 for utilizing a multi-functional storage container for storing an item, in accordance with at least one embodiment. The method 900 may be performed utilizing computer-readable instructions stored in one or more computer-readable storage media. Upon execution of these computer-readable instructions, the one or more processors may be caused to perform the operations of method 900.

The method may being at 902, where an indication that an item is to be stored within a storage facility may be received (e.g., by the storage container manager module 612 of FIG. 6). In some embodiments, the storage facility may comprise a storage container. The storage container may comprise a first set of storage components designated for items that are manually placed and a second set of storage components designated for items that are robotically placed.

At 904, a placement method for placing the item may be determined (e.g., by the storage container manager module 612). In some embodiments, the placement method may comprise manual placement or robotic placement. As discussed herein, the placement method may be determined based at least in part on any suitable factor such as one or more attributes associated with the item, one or more attributes associated with individual storage components, availability of personnel to store the item, availability of robotic devices to store the item, availability of storage components capable of storing the item, or the like.

At 906, a storage component of the storage container may be selected based at least in part on the placement method. By way of example, the storage container manager module 612 may identify that the item is to be manually placed. Based on this determination, the storage container manager module 612 may consult configuration data of the storage container to identify an available storage component that is designated for manual placement. Conversely, the storage container manager module 612 may identify that the item is to be robotically placed. Based on this determination, the storage container manager module 612 may consult configuration data of the storage container to identify an available storage component that is designated for robotic placement.

At 908, instructions for placing the item at the selected storage component may be provided to a robotic device (e.g., for robotic placement) or a computing device (e.g., for manual placement) within the storage facility. In some embodiments, the instructions may be utilized by the robotic device to perform the actual placement of the item. In some embodiments, the instructions may include an indication, presentable at the computing device, that indicates the item is to be placed at the selected storage component.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory system, comprising:
  a storage container of a storage facility comprising a first portion designated as storage for manually-placed items and a second portion designated as storage for robotically-placed items, the first portion comprising a first set of storage components, and the second portion comprising a second set of storage components;
  a robotic device configured to transfer an item to the storage container;
  a portable device configured to receive instructions associated with placement of an item within the storage container; and
  a management module configured to:
    maintain configuration data indicating that the first portion of the storage container is designated as storage for items to be manually placed and that the second portion of the storage container is designated as storage for items to be robotically placed;
    receive indication that the item is to be stored within the storage facility;
    determine whether the item is to be manually placed or robotically placed;
    select a storage component of the storage container to store the item based at least in part on determining whether the item is to be manually placed or robotically placed and the configuration data;
    determine a designation of the storage component based at least in part on the configuration data;
    based at least in part on determining that the designation of the storage component corresponds to storage for items to be manually placed, provide instructions to the portable device that indicate that the item is to be placed at the storage component selected; and
    based at least in part on determining that the designation of the storage component corresponds to storage for items to be robotically placed, provide instructions to the robotic device to place the item at the storage component selected.

2. The inventory system of claim 1, wherein the first set of storage components comprise a first subset and a second subset, wherein the first subset of storage components are situated at a top portion of the storage container, and wherein the second subset of storage component are situated at a bottom portion of the storage container.

3. The inventory system of claim 1, wherein the second set of storage components is situated between the first subset and the second subset of the first set of storage components.

4. The inventory system of claim 1, wherein the second set of storage components are between a lower height threshold and an upper height threshold, the lower height threshold being taller than a bottom of the storage container, and the upper height threshold being shorter than a top of the storage container.

5. The inventory system of claim 1, wherein the first set of storage components differ in size or type from the second set of storage components.

6. The inventory system of claim 1, wherein the first set of storage components and the second set of storage components comprise storage trays.

7. The inventory system of claim 6, wherein a first set of storage trays of the first set of storage components are larger in size than a second set of storage trays of the second set of storage components.

8. A computer-implemented method, comprising:
  receiving, by a computing device, an indication that an item is to be stored within a storage facility, the storage facility comprising a storage container, the storage container comprising a first set of storage components designated for items that are robotically placed and a second set of storage components designated for items that are manually placed;
  determining, by the computing device, that the item is to be robotically placed; and
  in response to determining that the item is to be robotically placed:
    selecting, by the computing device, a storage component for the item from the first set of storage components of the storage container; and
    providing, by the computing device to a robotic device within the storage facility, instructions for placing the item at the storage component selected.

9. The computer-implemented method of claim 8, further comprising:
  in response to determining that the item is to be manually placed:
    selecting a manual storage component for the item from the second set of storage components of the storage container; and
    providing, to a portable device within the storage facility, instructions that indicate the item is to be placed at the manual storage component selected.

10. The computer-implemented method of claim 8, further comprising enforcing a set of policies to inhibit selection of the storage component from any of the first set of storage components designated for manually-placed items when the item is to be robotically placed and to inhibit selection of the storage component from any of the second set of storage components designated for robotically-placed items when the item is to be manually placed.

11. The computer-implemented method of claim 8, wherein selecting the storage component further comprises consulting configuration data associated with the storage container, the configuration data a first set of designations for the first set of storage components and a second set of designations for the second set of storage components.

12. The computer-implemented method of claim 8, wherein the first set of storage components each comprise one or more physical markers, the one or more physical markers indicating a subsection of a storage component.

13. The computer-implemented method of claim 12, wherein selecting the storage component for the item further comprises selecting a subsection placement within the selected storage component based at least in part on one or more physical markers of the selected storage location.

14. One or more computer-readable storage media comprising computer-readable instructions that, upon execution by one or more processors, cause the one or more processors to perform operations comprising:
   receiving an indication that an item is to be stored within a storage facility, the storage facility comprising a storage container, the storage container comprising a first set of storage components designated for items that are manually placed and a second set of storage components designated for items that are robotically placed;
   determining a placement method for placing the item, the placement method comprising manual placement or robotic placement;
   selecting a storage component of the storage container based at least in part on the placement method; and
   providing, to a robotic device or a computing device within the storage facility, instructions for placing the item at the selected storage component.

15. The computer-readable medium of claim 14, wherein the placement method is determined to be robotic placement, and wherein the instructions for placing the item are provided to the robotic device within the storage facility.

16. The computer-readable medium of claim 15, wherein the placement method is determined to be manual placement, and wherein the instructions for placing the item are provided to the computing device within the storage facility.

17. The computer-readable medium of claim 14, wherein the operations further comprise enforcing restrictions to ensure that the item that is to be manually placed is not placed in the second set of storage components designated for robotically placed items.

18. The computer-readable medium of claim 14, wherein determining the placement method is based at least in part on one or more attributes associated with the item and availability within the components of the storage container to store the item.

19. The computer-readable medium of claim 14, wherein the first set of storage components are configured differently than the second set of storage components, the first set of storage components being optimized for manual placement and the second set of storage components being optimized for robotic placement.

20. The computer-readable medium of claim 14, wherein the operations further comprise maintaining configuration data associated with the storage container, the configuration data specifying that the first set of storage components designated for manual placement and the second set of storage components are designated for robotic placement, wherein selecting a storage component of the storage container is further based at least in part on the configuration data.

* * * * *